(12) United States Patent
Tang et al.

(10) Patent No.: US 8,524,858 B2
(45) Date of Patent: Sep. 3, 2013

(54) PREPARATION OF HYPERBRANCHED POLY(TRIAZOLE)S BY IN SITU CLICK POLYMERIZATION AND ADHESIVE CONTAINING THE SAME

(75) Inventors: Benzhong Tang, Hong Kong (CN); Youhong Tang, Guangdong (CN); Ka Wai Jim, Hong Kong (CN); Anjun Qin, Hangzhou (CN); Wing Yip Lam, Hong Kong (CN); Jie Li, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 156 days.

(21) Appl. No.: 12/984,886

(22) Filed: Jan. 5, 2011

(65) Prior Publication Data
US 2011/0171448 A1    Jul. 14, 2011

Related U.S. Application Data

(60) Provisional application No. 61/282,262, filed on Jan. 8, 2010.

(51) Int. Cl.
*C08G 73/06*    (2006.01)
*C08G 73/00*    (2006.01)

(52) U.S. Cl.
USPC ........... 528/423; 528/485; 528/491; 528/503; 427/207.1; 427/208.2

(58) Field of Classification Search
USPC .............. 528/423, 485, 491, 503; 427/207.1, 427/208.2
See application file for complete search history.

(56) References Cited

U.S. PATENT DOCUMENTS
7,772,358 B2 *   8/2010   Tang et al. ................ 528/268

OTHER PUBLICATIONS

Diaz et al; Click Chemistry...azide alkyne cycloaddition; May 2004; Published on line in Wiley InterScience; pp. 4392-4403.*
Qin et al; Hyperbranched polytriazoles... fluorescent Patterning; 208; American Chemicla Society; Chem Abstract 149:54344.*
Tang et al; Preparation... dipolar cycloaddition; 2008; China; Chem Abstract 148: 518104.*
Qin et al; Hyperbranched... fluorescent patterning; Macromolecules (2008), 41(11), 3808-3822; Chem Abstract 149: 54344.*
Tang et al; Preparation... cycloaddition; the Hong kong University of Science and Technology, Peop. REp. China; May 2008; Chem Abstract 148: 518104.*

* cited by examiner

*Primary Examiner* — Duc Truong
(74) *Attorney, Agent, or Firm* — Nath, Goldberg & Meyer; Tanya E. Harkins

(57) ABSTRACT

Provided is a high temperature-resistant metal adhesive containing hyperbranched poly(triazole)s synthesized by in situ azide/alkyne click polymerization. Also provided is a method for preparing the same adhesives by in situ click polymerization of azide and alkyne monomers on metal substrates. The method is optimized to get high adhesive strength at room temperature or elevated temperatures by analyzing the effects of monomer ratio, curing temperature and time, and annealing temperature and time. The hyberbranched poly(triazole)s adhesive has comparable or better temperature resistance compared with known high temperature epoxy metal adhesives, and it is the first high temperature metal adhesive using hyperbranched poly(triazole)s prepared by in situ azide/alkyne click polymerization.

11 Claims, 2 Drawing Sheets

PREPARATION OF HYPERBRANCHED POLY(TRIAZOLE)S BY IN SITU CLICK POLYMERIZATION AND ADHESIVE CONTAINING THE SAME

CROSS-REFERENCE TO RELATED APPLICATIONS

Pursuant to 35 U.S.C. §119(e), this application claims the benefit of U.S. Provisional Application Ser. No. 61/282,262, filed on Jan. 8, 2010 in the name of BEN ZHONG TANG et al., which is entitled "Synthesis of Hyperbranched Poly(triazole)s by Click Polymerization and Exploration of Their Adhesive Applications." The provisional application is hereby incorporated by reference as if it were fully set forth herein.

BACKGROUND OF THE INVENTION

1. Field of the Invention

The present subject matter relates to an adhesive comprising hyperbranched poly(triazole)s and a method for preparing the same. In particular, the present subject matter relates to a high temperature-resistant metal adhesive comprising hyperbranched poly(triazole)s formed by azide and alkyne monomers by click polymerization.

2. Description of Related Art

Synthesis of 1,2,3-triazoles by 1,3-dipolar cycloaddition of azides and alkynes was discovered by Arthur Michael at the end of the 19$^{th}$ century (1) and significantly developed by Rolf Huisgen in the 1960s (2). This area of research was quiescent until the azide/alkyne click reaction, so called the Sharpless click reaction, was discovered by Sharpless and his co-workers (3). The reaction has many advantages: i) it brings about sufficiently high yielding, ii) it has high tolerance to functional groups, iii) it is insensitive to reaction media, regardless of their protic/aprotic or polar/non-polar character, and iv) it is able to react at various types of interfaces, e.g., solid/liquid, liquid/liquid and solid/solid interfaces (4, 5).

Hyperbranched organometallic polymers were prepared and they are useful as precursors to advanced ceramic materials (U.S. Pat. No. 6,759,502 to Ben Zhong Tang et al.). Synthesizing hyperbranched polymers by the self-condensation of $AB_n$ monomers has some limitations, because $AB_n$ monomers are usually obtained via tedious synthesis approaches necessary for asymmetric functionality (6, 7). Moreover, $AB_n$ monomers are difficult to prepare and purify, and they suffer from self-oligomerization during storage under ambient conditions (7).

$A_2+B_3$ type polymerization has been demonstrated to be an alternative route for hyperbranched polymers, as monomers $A_2$ and $B_3$ are easily obtained and are free of self-oligomerization problems encountered in the $AB_n$ system. Still, the preparation of hyperbranched polymers requires multistep reactions and tedious product isolation, and long reaction time and poor product solubility are major obstacles (8).

Synthesis of hyperbranched poly(triazole)s by click polymerization was reported by the present inventors (9) where $A_2+B_3$ approach was used with easy-to-make and stable-to-keep diazide ($A_2$) and triyne ($B_3$) monomers. The $A_2/B_3$ monomers were readily polymerized by a metal-mediated click reaction and thermally catalyzed Huisgen cycloaddition. It was importantly noted that in the absence of a transition-metal catalyst, the reactions were not regioselective, and when catalyzed with Cu- and Ru-catalysts, click polymerization produced hyperbranched polymers with regular 1,4- and 1,5-linkages, respectively. Both polymers are soluble in typical solvents, such as dichloromethane (DCM), tetrahydrofuran (THF), and dimethyl sulfoxide (DMSO), representing the first example of hyperbranched poly(triazole)s with regioregular structures and macroscopic processability. However, adhesive properties of the polymers and their application for adhesives, particularly high temperature-resistant adhesives have not been studied in the report.

Joining metal substrates by adhesive bonding has numerous advantages over other techniques, such as welding, soldering and mechanical fastening, which include reducing weight, improving fatigue resistance, providing uniform stress distribution and potentially reducing cost (10).

Triazoles have long been known for their strong affinity for metal ions and surfaces, which makes them popular components of polymers used as metal coatings and adhesives. The metal adhesive qualities of polymeric 1,2,3-triazoles have been reported by many researchers (11). Polymer structures containing triazoles were found to enhance binding to copper. Adhesive polymers were formed by assembling polyvalent azides and alkynes into crosslinked polymer networks by copper-catalyzed 1,3-dipolar cycloaddition in US 20080311412 to Valery Fokin et al. Sharpless and his co-workers (12, 13) found that Cu(I) species could efficiently catalyze the azide/alkyne click reaction and create a strong affinity with copper surfaces. The increased reaction rate is mostly explained by the promotion of the formation of the Cu(I)-acetylide, reduction in the oxidation of the Cu(I)-species, and prevention of side reactions of the acetylenes (14). Catalysts for phosphorus-containing compounds and sulfur-containing compounds were reported in WO 2009/051025 to Han et al.

SUMMARY OF THE INVENTION

Hyperbranched poly(triazole)s have been successfully prepared in the present application by in situ click polymerization of diazides ($A_2$) and triyne ($B_3$) monomers on different metal surfaces, such as copper (e.g., yellow brass), iron (e.g., carbon steel) and aluminum (e.g., aluminum alloy), and their adhesive properties have been characterized. Optimizations have been performed to obtain high adhesive strength at different temperatures by analyzing the effects of curing kinetics, annealing temperature and time, catalyst, monomers ratio, surface conditions, alkyl chain length of diazides ($A_2$), and so on. The poly(triazole)s adhesive has comparable or even better heat resistance compared with some well-known high temperature epoxy metal adhesives. Also, under the same conditions, adhesives prepared on copper substrates were found to have higher adhesive strength than those prepared on aluminum and iron substrates, and use of a slight excess of triyne ($B_3$) monomers in synthesis results in greater adhesive strength than use of an excess of diazide ($A_2$) monomers. This is the first high temperature metal adhesive using hyperbranched polytriazoles synthesized via in situ azide/alkyne click polymerization. In addition, the light-emitting property of synthesized polymers under UV irradiation could be used to check the failure mode of adhesive bonding.

Accordingly, one aspect of the present subject matter is to provide an adhesive comprising hyperbranched poly(triazole)s formed by in situ click polymerization of diazide ($A_2$) and triyne ($B_3$) monomers. The adhesive is stable at high temperature (up to 200° C.) and has strong bonding strength. In an embodiment, the hyperbranched poly(triazole)s are poly(1,4/1,5-disubstituted 1,2,3-triazole)s and are formed on Fe or Al metal surface via thermal Huisgen cycloaddition. In another embodiment, the hyperbranched poly(triazole)s are poly(1,4-disubstituted 1,2,3-triazole)s and are formed on Cu metal surface.

Another aspect of the present subject matter is to provide a method for preparing adhesives comprising in situ click polymerization of azide and alkyne monomers on metal substrates, and thereby obtaining hyperbranched poly(triazole)s formed by in situ click polymerization. In an embodiment, the method comprises: pretreating metal substrates by degreasing in an organic solvent, preparing azide and alkyne monomer solutions, immediately depositing the azide and alkyne solutions onto the metal substrates, and curing the metal substrates at a suitable temperature for a suitable time to obtain hyperbranched poly(triazole)s with high tensile strength. In an embodiment of the present subject matter, the method is performed directly on the metal substrates, such as Cu, Al or Fe.

Still another aspect of the present subject matter is to provide a method of improving adhesive bonding strength of metal adhesives, where the adhesives are prepared by in situ click polymerization of azide and alkyne monomers on metal substrates at elevated temperature.

DETAILED DESCRIPTION OF THE INVENTION

1. Definitions

Figure 1:
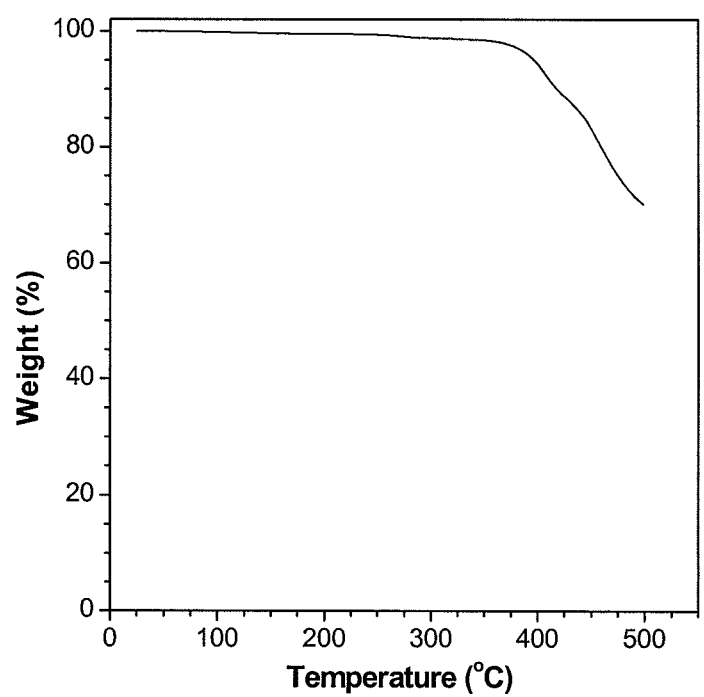
FIG. 1 shows a TGA thermograph of the hyperbranched polytriazole adhesive formed by monomers 1 and 2 in air at a heating rate of 20° C./minutes.

The below definitions serve to provide a clear and consistent understanding of the specification and claims, including the scope to be given such terms.

As used herein, the phrase "click polymerization" refers to polymerization using click chemistry, or a click reaction, which refers to a set of covalent bond forming reactions between two functional groups with high yields that can be performed under extremely mild conditions (18). Click reactions are generally reactions between a carbon atom and a heteroatom that are irreversible, highly energetically favored, go largely to completion, and occur between two groups that are generally unreactive except with respect to each other. Click chemistry techniques are described in many references. In an embodiment of the present subject matter, cycloaddition reactions are used, such as the Huisgen 1,3-dipolar cycloaddition of azides and alkynes in the presence of, for example, Cu(I) salts, thereby forming 1,4-disubstituted 1,2,3-triazoles.

The phrase "in situ" (or in-situ) or "in situ polymerization" used herein refers to polymerization performed directly on metal surfaces. In an embodiment, the in situ polymerization is performed on the metal surfaces such as Cu, Fe and Al metal surfaces.

The term "polymer" used herein refers to a chemical compound of repeating structural units (monomers) connected by covalent bonds. A polymer is typically of high molecular weight and may comprise 10s to 1000s or even more monomers. In certain embodiments, the polymer comprises at least 10 monomeric units linked covalently together; the polymer may be crosslinked; and the polymer may be hyperbranched. In an embodiment, the polymer is formed by in situ polymerization on metal surfaces.

Unless defined otherwise all technical and scientific terms used herein have the same meaning as commonly understood to one of ordinary skill in the art to which the presently described subject matter pertains.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

2. Adhesives

The provided high temperature-resistant metal adhesive comprises hyperbranched poly(triazole)s formed by in situ click polymerization of two monomers: diazide ($A_2$) and triyne ($B_3$):

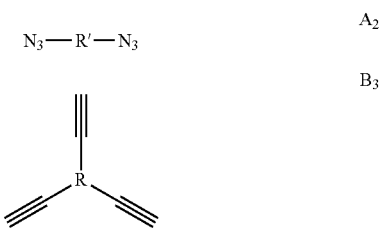

wherein R and R' are each an organic compound optionally containing inorganic elements. In particular, the R and R' are each independently selected from the following group:

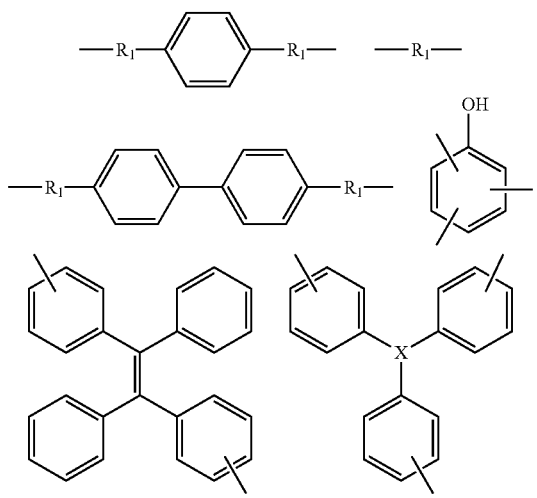

where X is a heteroatom, and $R_1$ is an alkyl, vinyl, acetyl, aryl, heteroaryl, cycloalkyl, heterocycloalkyl, or heteroalkyl group.

In an embodiment, the hyperbranched poly(triazole)s are produced with monomers $A_2$ and $B_3$ as regiorandom poly(triazole)s via thermal Huisgen cycloaddition, as schemed in the following:

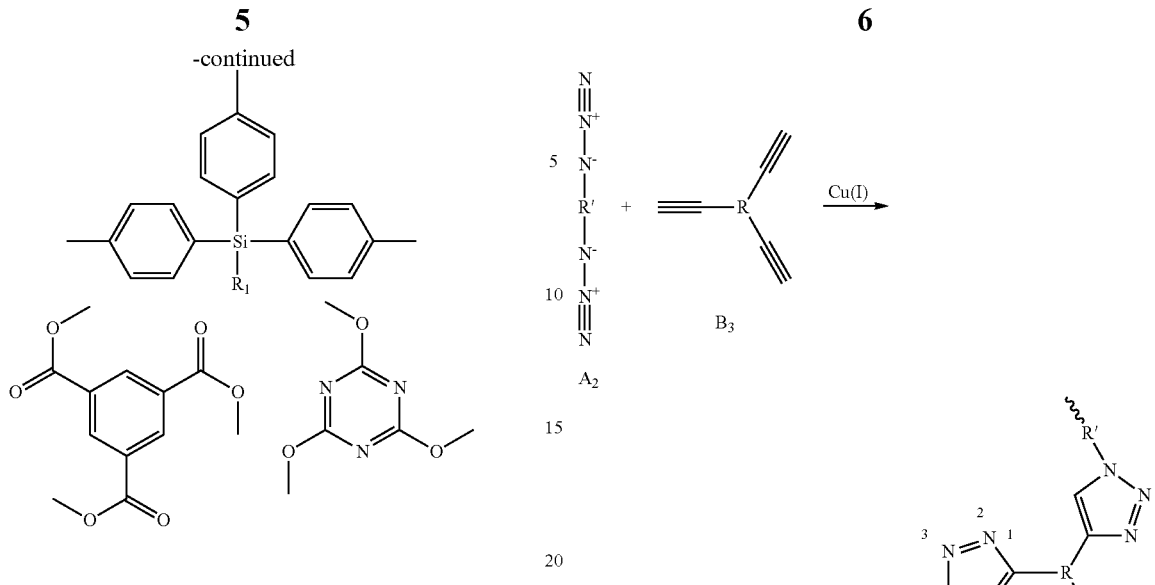

wherein R and R' are defined the same as above regarding $A_2$ and $B_3$. The produced hyberbranched poly(triazole)s are regiorandom poly(1,4/1,5-disubstituted-1,2,3-triazole)s.

In another embodiment, the hyperbranched poly(triazole)s are poly(1,4-disubstituted 1,2,3-triazole)s and formed on Cu metal surface, as schemed in the following:

wherein R and R' are defined the same as above regarding $A_2$ and $B_3$. Under the same conditions, the curing process on the brass surface is much faster than that on the carbon steel and aluminum alloy surface since the chemical-treated brass surface can supply Cu(II) which can react with Cu(0), giving Cu(I) as the catalyst of the azide/alkyne 'click' polymerization (the rate of acceleration is about $10^5$).

In an embodiment of the present subject matter, the monomers can be selected according to the following schemes:

Scheme 2

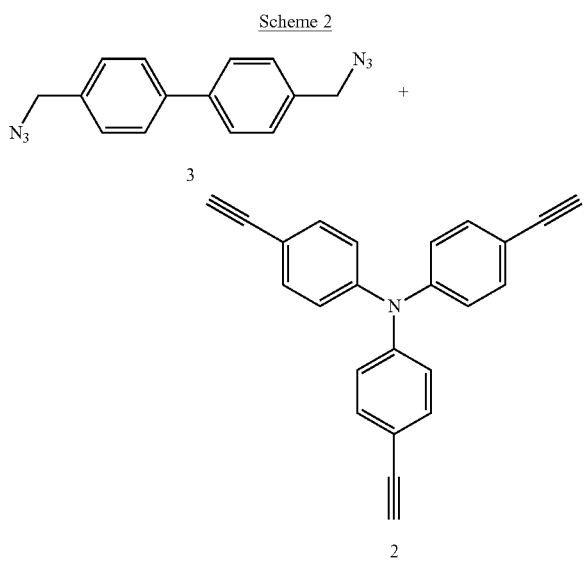

3

Scheme 3

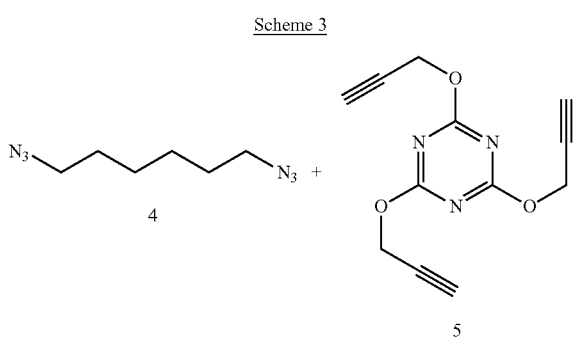 [SMILES: [N-]=[N+]=NCCCCCCN=[N+]=[N-] ; C#CCOc1nc(OCC#C)nc(OCC#C)n1]

The provided high temperature-resistant metal adhesive is synthesized via in-situ azide/alkyne click polymerization on different metal surfaces. Non-limiting examples of the metals include Cu, Al and Fe metals. In an embodiment, yellow brass, aluminum alloy or carbon steel is used for the Cu, Al and Fe metals, respectively.

The provided high temperature-resistant metal adhesives are very stable in high temperatures, have no weight loss at about 200° C., and may have less than 5% of weight loss at over 400° C. The adhesives have high tensile strength, even when annealed at 100° C. or 150° C. for a period of time from 0.2 to 8 hours.

The adhesive layer on metals may range from several to ten micrometers thick. In an embodiment, the adhesive layer is 7 μm thick.

A successful formation of the adhesive on a metal surface requires two procedures: formation of a polymer and binding of the polymer on the metal surface.

3. Formation of Polymers

The reaction for forming the polymers is a fusion process leaving no byproducts. This chemistry may therefore be expected to provide efficient polymer formation and the possibility of highly active catalytic domains in the developing polymers to enhance crosslinking, which will also favor binding with the metal surface.

A crosslinked polymer was conveniently synthesized from $A_2$ and $B_3$ monomers 1 and 2. The [3+2] cycloaddition of these units provides 1,2,3-triazoles, which are noteworthy for their pseudoaromatic nature (providing the ability to engage in π-stacking), large dipole moment, and excellent hydrogen-bonding ability, so they are extraordinarily stable to other chemical reagents, high temperatures, oxidation and reduction.

The formation of the polymer can be accomplished by thermal polymerization and catalyst-polymerization (9, 19). Triyne 2 can undergo thermal polymerization with diazide 1 in a polar solvent to produce high molecular weight polymers with regiorandom structure, and macroscopic processability with good yields, albeit at a slow rate. For example, reaction in a dioxane for a long period (e.g. 72 hours) at 101° C. results in the formation of polymeric products with an $M_w$, value of 177,500 (by the LLS technique) and 75.7% yield. In the presence of copper(I) catalyst and under the condition of 60° C. in dimethylformamide (DMF) for 1.33 hour, 1,4-disubstituted 1,2,3-triazoles are isolated in ~51.6% yield with an $M_w$ value of 5,000, indicating moderate reactivity. The click reaction catalyzed by Cp*Ru(PPh$_3$)$_2$Cl produces 1,5-disubstituted 1,2,3-triazoles with higher yielding (~75.0%) and $M_w$ (9,400) at 60° C. in THF for 0.5 hour.

During the curing process, the present poly(triazole)s can be efficiently formed via thermal or Cu(I)-catalyzed azide/alkyne click polymerization, depending on the metal substrates used. For carbon steel or aluminum alloy, adhesives can be cured via pure thermal click polymerization at 125° C. for 8 hours—a much longer period of time than that in the case of the brass substrate wherein it can be cured at 125° C. only for 2 hours, because the chemically-pretreated brass surface can supply Cu(II) which can react with Cu(0), producing Cu(I) served as the catalyst for the azide/alkyne click polymerization (the rate of acceleration is about $10^5$).

4. Binding of Polymers on Metal Surfaces

For binding of a polymer formed by in situ click polymerization onto a metal surface, in addition to mechanical locking, two factors are particularly important: the number of arms of the monomeric unit and the presence of an amine group. In the present application, suitable monomers are fixed on the metal substrates and a process to obtain maximum adhesive strength in the hyperbranched poly(triazole)s obtained by the monomers was optimized, with investigating various factors that can affect the strength, such as different curing kinetics, catalysts, annealing temperatures and time, substrates, molar ratios of monomeric units, and test modes.

The monomers used herein can be prepared by any synthetic method known in the art. They are also commercially available. Solutions of the monomers in THF can be prepared before use. In an embodiment, 0.9M concentration of azide monomer is used. The molar concentration of alkyne monomer can be used according to the functional group molar ratio described in Table 3. A little excess of alkyne group is beneficial to obtain stronger tensile strength, particularly at the ratio of 1.0, 0.9 and 0.8 of azide groups to alkyne groups. A little excess of alkyne group is the prerequisite not only to obtain the high tensile strength but also to cure the adhesive in a short time. Too much excess of alkyne can decrease the tensile strength.

Carbon steel (e.g., WCB, China), yellow brass (e.g., H62, China) and aluminum alloy (e.g., 6163, China), for example, can be used as metal substrates. Surfaces of iron, copper and aluminum can be pretreated by degreasing and merging in an organic solvent, particularly a polar solvent, followed by thorough rinsing with water. They are then dried in compressed air and stored in a dry container.

After preparing azide and alkyne monomer solutions, they are deposited immediately within 30 minutes onto the metal substrates, followed by curing at a heating rate 5° C./minute. In an embodiment, approximately 0.041 ml is deposited immediately onto the metal surface for a tensile test. The surface bonding area for a tensile test may be approximately 315 mm$^2$.

Previous reports show that hyperbranched poly(triazole)s are light-emitting materials, due to their high luminescence and hole-transporting efficiency (9, 16). This property may be used herein to check the coverage of the in situ polymerized adhesive polymers on the substrate surfaces, as well as the failure mode caused during mechanical testing. Fluorescent images are readily generated by UV irradiation of the polymer films after mechanical testing and can be used to check the coverage of the in situ polymerization polymers on the metal surfaces and the failure mode of adhesives during testing.

EXAMPLES

The present subject matter can be illustrated in further detail by the following examples. However, it should be noted that the scope of the present subject matter is not limited to the examples. They should be considered as merely being illustrative and representative for the present subject matter.

1. Materials

Unless otherwise stated, all the chemicals used here are commercially available from Aldrich. Azide 1 ($A_2$, 1,4-bis(6-azidohexyloxy)benzene) and alkyne 2 ($B_3$, tris(4-ethynylphenyl)amine) were prepared using published procedures and purified by silica gel columns (9,15). $A_2$ and $B_3$ monomers prepared herein were stable and were stored in a dark place at room temperature for a long period. No structural changes that can be caused by such undesired reactions as self-oligomerization were observed after the monomers had been kept in the laboratories for more than 6 months.

Fresh stock solutions of the monomers 1 and 2, as shown in Scheme 1, above, in THF were prepared just before use. 0.9M concentration and 1M concentration for monomers 1 and 2 were used, respectively. In addition, with monomers 3 and 2, as well as with monomers 4 and 5, as shown in Schemes 2 and 3, above, fresh stock solutions were prepared in the same way as above for monomers 1 and 2.

2. Pretreatment of Metal Surfaces

Yellow brass (H62, China), carbon steel (WCB, China), and aluminum alloy (6163, China) were used as metal substrates with the modified geometry (25 mm×25 mm) according to ASTM D-2094. Reused test specimens were re-machined to remove previous adhesive residual. All the metal surfaces were prepared according to ASTM D-2651.

In particular, yellow brass surface was pretreated with the following steps: i) degrease via suspending in acetone for 10 min, ii) immerse for 1 min at room temperature in the following solution by weight: 197 parts water, 30 parts nitric acid (sp gr 1.42), to 15 parts ferric chloride solution (42%); iii) rinse thoroughly with running deionized water for 10 min; iv) dry as quickly as possible via compressed air; v) apply adhesives within 30 min.

Carbon steel surface was prepared with the following steps: i) degrease via suspending in acetone for 10 min; ii) immerse for 5 min at room temperature in the following solution by volume: 5% nitric acid (sp gr 1.42), 30% phosphoric acid (85 wt %), 65% deionized water; iii) rinse thoroughly with running deionized water for 10 min; iv) dry as quickly as possible via compressed air; v) apply adhesives within 30 min.

Aluminum alloy surface was treated with the following steps: i) degrease by immerse for 10 min at 75° C. in the following alkaline solution (by weight): 3.0 parts sodium metasilicate, 1.5 parts sodium hydroxide, 0.5 parts sodium dodecylbenzene, to 133.0 parts deionized water; ii) rinse thoroughly with deionized water for 5 min; iii) immerse for 10 min at 60° C. in the following solution: 30 wt % sulfuric acid, 140 g/L ferric sulfate, to deionized water; iv) rinse thoroughly with running deionized water for 10 min; v) dry as quickly as possible via compressed air; vi) apply adhesives within 30 min.

3. Tests

The tensile strength of the present poly(triazole)s adhesive and the commercial adhesives was determined by bonding two metal substrates together using the corresponding adhesives and measuring the tensile strength via Material Test System (MTS) 810.

Tensile test was carried out using Material Test System 810 with a cross-head rate of 2.54 mm/min according to ASTM D-2094. Specimens tested at different elevated temperatures were heated via Environment Chamber 651 and Temperature controller 409~80 (temperature error is ±1° C.) with a heating rate of 5° C./min and equilibrated for 10 minutes prior to testing (different annealing time was used when studying the annealing time effect). At least 3 specimens for each test condition were tested.

Thermal stability was evaluated by measuring thermogravimetric analysis (TGA) thermograms on a Perkin-Elmer TGA 7 under air atmosphere at a heating rate of 20° C./min.

Example 1

Preparation of Metal-Adhesives on Metal Surfaces

Approximately 0.041 ml (via a micro-injector) monomer solution, for a tensile test (the thickness of the resulting polytriazole adhesive is about 7 µm evaluated via Tof-SIMS), were deposited immediately onto one adherend, while the other adherend was used to disperse the solution until a monomer layer covered the surface uniformly and the THF solvent evaporated. Specimens were fixed via the tape to keep good alignment, then a light pressure (about 2 psi) was applied and specimens were cured in the oven with a heating rate of 5° C./min under the specific temperature and time conditions: 125° C. for 2 hours for yellow brass substrate, while 125° C. for 8 hours in the case of carbon steel and aluminum alloy substrates unless otherwise stated. After heating, specimens were cooled down slowly, and then kept warm at 50° C. for 2 hours before cooling to room temperature.

As a comparative test, specimens of commercial epoxy adhesives (Strength 139: Strength Advanced Materials (Europe) BVBA, B-2068 Everberg Belgium, two-component epoxy adhesive; Araldite 2014: Huntsman Advanced Materials, two-component epoxy adhesive; Permabond ES550: Permabond Engineering Adhesives, one-component epoxy adhesive) were cured according to their corresponding product handbooks with the same aforementioned surface pretreatment.

Example 2

Effect of Curing Kinetics

The nature of substrates plays an important role in the curing process of the poly(triazole)s adhesive. As aforementioned, azide/alkyne click polymerization can be thermally driven or Cu(I) catalyzed (the rate of acceleration is about $10^5$). For using 1 and 2 as the monomers on carbon steel or aluminum alloy, the adhesive was cured via pure thermal click polymerization at 125° C. for 8 hours (see Table 1 below), obtaining the highest tensile strength at room temperature (Carbon steel: 34.75±0.84 MPa tested at 25° C., aluminum alloy: 31.45±3.27 MPa tested at 25° C.). In the case of the brass substrate, the poly(triazole)s adhesive was completely cured at 125° C. only for 2 hours (37.12±1.49 MPa tested at 25° C., see Table 2 below), because the chemically-pretreated brass surface can supply Cu(II) which can react with Cu(0), producing Cu(I) to serve as the catalyst.

The curing temperature and time are also a key to achieve high adhesive strength as evidenced by the following experimental results: when cured at a lower temperature at 90° C. the curing process not only needs a longer period of time but also obtains a lower adhesive strength (20.19±1.25 MPa for 4 h, 25.68±1.53 MPa for 8 h, 26.64±2.13 MPa for 24 h, tested at 25° C. on the brass surface) compared with the curing process at 125° C.

branching and the molecular weight of the resulting polymers. The effect of the molar ratio of azide group to alkyne group on the tensile strength of poly(triazole)s adhesive was tested in the range from 1.5 to 0.6.

As shown in Table 3, below, it is indicated that a little excess of alkyne group being beneficial to obtain stronger tensile strength, evidenced by the observed tensile stress is 25.45±3.12 MPa, 37.12±1.49 MPa and 31.45±2.14 MPa at the ratio of 1.0, 0.9 and 0.8, respectively. Too much excess of alkyne can decrease the tensile strength (22.47±1.13 MPa with the ratio of 0.6), since the big gap between the azide and alkyne group can significantly reduce the degree of branching and the molecular weight of the resulting polytriazole adhesive.

This is also indicated by the fact that the failure mechanism is adhesive failure in the case of the ratio of 0.6, while in the former three cases it is interface failure mechanism. When the ratio is less than 1.0, the polytriazole adhesive cannot be

TABLE 1

Curing time effect on tensile strength of polytriazole adhesive on carbon steel and aluminum alloy surfaces

| Curing time (h) | 1.0 | 4.0 | 6.0 | 8.0 | 10.0 | 16.0 |
|---|---|---|---|---|---|---|
| Tensile Stress (MPa) on Carbon Steel Surface | 7.40 ± 0.25 | 17.26 ± 1.23 | 25.95 ± 1.05 | 34.75 ± 0.84 | 27.55 ± 1.46 | 25.57 ± 0.26 |
| Tensile Stress (MPa) on Aluminum Alloy Surface | 1.56 ± 0.36 | 12.57 ± 1.92 | 25.14 ± 0.72 | 31.45 ± 3.27 | 24.76 ± 2.31 | 24.76 ± 1.37 |

Cured at 125° C.; tested at 25° C.; the molar ratio of azide group to alkyne group is 0.9.

TABLE 2

Curing time effect on tensile strength of polytriazole adhesive on yellow brass surface

| | Curing time (h) | | | | |
|---|---|---|---|---|---|
| | 0.5 | 1.0 | 2.0 | 4.0 | 8.0 |
| Tensile Stress (MPa) on Carbon Steel Surface | 11.12 ± 0.36 | 25.34 ± 1.02 | 37.12 ± 1.49 | 24.69 ± 2.74 | 15.27 ± 1.80 |

Cured at 125° C.; tested at 25° C.; The molar ratio of azide group to alkyne group is 0.9.

Example 3

Effect of the Molar Ratio of Monomers

For the $A_2+B_3$ type of polymerization to synthesize hyperbranched poly(triazole)s with monomer 1 and 2, the molar ratio of monomers can significantly affect the degree of cured at 125° C. for 2 hours. Even in case the curing time was increased up to 8 hours, the adhesion was still very weak (nearly 0 MPa), resulting in the very low tensile strength (see Table 3 below, for details). Therefore, a little excess of alkyne group is the crucial prerequisite not only to obtain the high tensile strength but also to cure the adhesive in a short time.

TABLE 3

Effect of the molar ratio of azide group to alkyne group on tensile strength

| | Molar ratio of azide group to alkyne group | | | | | |
|---|---|---|---|---|---|---|
| | 1.5 | 1.1 | 1.0 | 0.9 | 0.8 | 0.6 |
| Molar ratio of monomer $A_2$ to $B_3$ | 2.25 | 1.65 | 1.50 | 1.35 | 1.20 | 0.9 |
| Tensile Stress (MPa) | 0 | 1.28 ± 0.29 | 25.45 ± 3.12 | 37.12 ± 1.49 | 31.45 ± 2.14 | 22.47 ± 1.13 |

Cured at 125° C. for 2 hours; tested at 25° C.

Example 4

Effect of Annealing Temperatures and Time

Hyperbranched poly(triazole)s formed by monomer 1 and 2 are thermally stable in air, as indicated by the TGA result in FIG. 1. No weight loss occurred below 200° C., and the weight loss was less than 5% at 400° C. They are therefore good candidates for high temperature adhesive applications. The effect of annealing temperatures and time with monomer 1 and 2 was tested.

Figure 2:
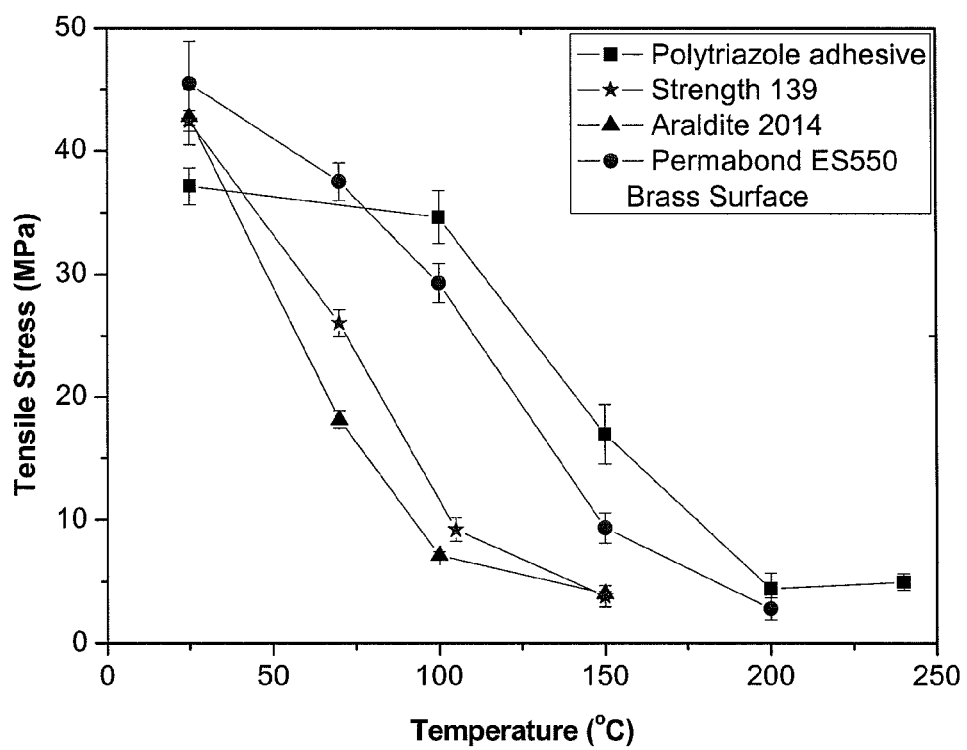
FIG. 2 shows comparison of tensile strength of the polytriazole adhesive using monomers 1 and 2 and other commercial high temperature-resistant epoxy metal adhesives at different temperatures on Yellow brass surface.

On the brass surface, the tensile strength stays very high at 100° C. (34.64±2.12 MPa, 93.3% of that at 25° C.), loses 54.3% at 150° C. (16.97±2.42 MPa), and remains 5.42±1.28 MPa at 200° C. (see Table 5 below), indicating the high temperature performance of the polytriazole adhesive is much better than the selected two-component high temperature epoxy metal adhesive (Araldite 2014 and Strength 139, one of the best high temperature epoxy adhesive produced by Huntsman Advanced Materials and Strength Advanced Materials (Europe), respectively), and comparable, even a little better as compared with Permabond ES550 (one-component high temperature epoxy metal adhesives, produced by Permabond Engineering Adhesives) (see FIG. 2 for details).

For high temperature adhesive application, the working life is also very crucial. The polytriazole adhesive can retain its good performance when annealed at elevated temperatures (34.76±1.23 MPa annealed at 100° C. for 8 hours, 17.42±0.40 MPa annealed at 150° C. for 8 hours, see Table 6 below), although it is a little dropped for 2 h-annealing induced by the stress concentration due to the incomplete relaxation of hyperbranched polymer chains. Indeed, the polytriazole adhesive has excellent temperature resistance as evidenced by the above annealing temperature and time study.

TABLE 4

Annealing temperature effect on tensile strength of the polytriazole adhesive using 1 and 2 on the carbon steel and aluminum alloy surfaces

| | | Temperature | | | |
|---|---|---|---|---|---|
| | | 25° C. | 100° C. | 150° C. | 200° C. |
| Tensile stress (MPa) | Carbon steel | 34.75 ± 0.84 | 27.37 ± 3.54 | 10.46 ± 1.51 | 4.42 ± 0.87 |
| | Aluminum alloy | 31.45 ± 3.27 | 24.66 ± 2.77 | 13.25 ± 1.41 | 5.52 ± 1.32 |
| Percentage of tensile stress at 25° C. | Carbon steel | — | 78.8% | 30.1% | 12.7% |
| | Aluminum alloy | — | 78.4% | 42.1% | 17.6% |

Cured at 125° C. for 2 h; the molar ratio of azide group to alkyne group is 0.9.

TABLE 5

Annealing temperature effect on tensile strength of the polytriazole adhesive using 1 and 2 on the yellow brass surface

| | Annealing Temperature (° C.) | | | | |
|---|---|---|---|---|---|
| | 25 | 100 | 150 | 200 | 240 |
| Tensile Stress (MPa) | 37.12 ± 1.49 | 34.64 ± 2.12 | 16.97 ± 2.42 | 5.42 ± 1.28 | 4.98 ± 0.99 |
| Percentage of tensile stress at 25° C. | — | 93.3% | 45.7% | 14.6% | 13.4% |

Cured at 125° C. for 2 h, the molar ratio of azide group to alkyne group is 0.9.

TABLE 6

Annealing time effect on tensile strength of the polytriazole adhesive using 1 and 2 on the yellow brass surface (annealed at 100° C. and 150° C.).

| | Annealing Time (h) | | | |
|---|---|---|---|---|
| | 0.2 | 2 | 4 | 8 |
| Tensile Stress Annealed at 100° C. (MPa) | 34.64 ± 2.12 | 27.03 ± 1.79 | 29.08 ± 1.92 | 34.76 ± 1.23 |
| Tensile Stress Annealed at 150° C. (MPa) | 16.97 ± 2.42 | 11.40 ± 0.93 | 18.17 ± 1.20 | 17.42 ± 0.40 |

Cured at 125° C. for 2 h, the molar ratio of azide group to alkyne group is 0.9.

Example 5

Effect of Annealing Temperature on Tensil Strength of the Hyperbranched poly(triazoles) Prepared by Monomers 3 and 4

Hyperbranched poly(triazole)s were formed with monomers 3 and 4 on brass surface, and the effect of annealing temperature on tensile strength was tested. The results are shown in Table 7.

TABLE 7

| | Annealing Temperature (° C.) | | | |
|---|---|---|---|---|
| | 25 | 100 | 150 | 200 |
| Tensile Stress (MPa) | 30.62 ± 0.67 | 23.12 ± 1.76 | 13.20 ± 0.58 | 8.56 ± 1.50 |

Cured at 125° C. for 2 h, the molar ratio of azide group to alkyne group is 0.9.

Example 6

Effect of Annealing Temperature on Tensile Strength of the Hyperbranched poly(triazoles) Prepared by Monomers 5 and 6

Hyperbranched poly(triazole)s were formed with monomers 5 and 6 brass surface, and the effect of annealing temperature on tensile strength was tested. The results are shown in Table 8.

TABLE 8

| | Annealing Temperature (° C.) | | | |
|---|---|---|---|---|
| | 25 | 100 | 150 | 200 |
| Tensile Stress (MPa) | 33.23 ± 1.71 | 18.76 ± 0.86 | 9.21 ± 0.75 | 5.90 ± 0.98 |

Cured at 125° C. for 2 h, the molar ratio of azide group to alkyne group is 0.9.

As can be seen from the foregoing examples, the present subject matter allows (a) economic advantage of in situ click polymerization of hyperbranched poly(triazole)s, (b) ease and simple advantage of in situ curing to form adhesive bonding, (c) a good way to get high adhesive strength on the different metal substrates and used in elevated temperatures, and (d) a simple and easy way to determine the failure mode of adhesive bonding. Thus, one can obtain high quality hyperbranched poly(triazole)s as adhesives for metal substrates by simple in situ click polymerization to get much higher bonding strength than commercial products at elevated temperatures. In other words, the presently provided method for synthesis of polymers is easy and convenient. It is a "green" method and can be applicable for optical innovations. Moreover, the provided method is simple and highly functionality-tolerant, and thus various functional groups can be introduced into hyperbranched poly(triazole)s, which may have a variety of applications for optical (light-emitting polymers, hole- or electron-transport materials, optical limiters), thermal (curable films, thermosets, adhesives), electrons (negative resist), and magnetic devices.

Although the present subject matter has been described herein with preferred embodiments, it should be understood that variations and modifications may be resorted to as will be apparent to those skilled in the art. Such variations and modifications are to be considered within the purview and the scope of the claims appended hereto.

REFERENCES

1. Michael, A. J. Prakt. Chem. 1893, 48, 94.
2. Huisgen, R., *Angew. Chem.* 1963, 75, 604; Huisgen, R., *Angew. Chem. Int. Ed. Engl.* 1963, 2, 565; Huisgen, R. Angew. Chem. 1963, 75, 742; Huisgen, R. *Angew, Chem. Int. Ed. Engl.* 1963, 2, 633.
3. Kolb, H. C., Finn, M. G., Sharpless, K. B., *Angew. Chem.* 2001, 113, 2056; Kolb, H. C., Finn, M. G., Sharpless, K. B., *Angew. Chem. Int. Ed.* 2001, 40, 2004.
4. Hawker, C. J., Fokin, V. V., Finn, M. G., Sharpless, K. B., *Aust. J. Chem.* 2007, 60, 381; Hawker, C. J., Wooley, K. L., *Science* 2005, 309, 1200.
5. Lutz, J.-F. *Angew. Chem.* 2007, 119, 1036; Lutz, J.-F. *Angew. Chem. Int. Ed.* 2007, 46, 1018.
6. Kim, Y. H., Webster, O. W., *J. Am. Chem. Soc.* 1990, 112, 4592.
7. Scheel, A. J., Komber, H., Voit, B., *Macromol. Rapid Commun.* 2004, 25, 1175; Smet, M., Metten, K., Dehaen, W., *Collect. Czech. Chem. Commum.* 2004, 64, 1097.
8. van Steenis, D. J. V. C., David, O. R. P., van Strijdonck, G. P. F., van Maarseveen, J. H., Reek, J, N. H., *Chem. Commum.* 2005, 4333; Bakbak, S., Leech, P. J., Carson, B. E., Sexena, S., King, W. P., Bunz, U. H. F., *Macromolecules* 2006, 39, 6793.
9. Qin, A.; Lam, J. W. Y.; Jim, C. K. W.; Zhang, L.; Yan, J.; Haussler, H.; Liu, J., Dong, Y.; Liang, D.; Chen, E.; Jia, G.; Tang, B. Z. *Macromolecules* 2008, 41, 3808
10. Shaw. S. J. *Mater. Sci. Tech.* 1987, 3, 589.
11. Qafsaoui, W., Blanc, C., Rogues, J., Pebere, N., Srhiri, A., Mijoule, C., Mankowski, G., *J. Appl. Electrochem.* 2001, 31, 223; Qafsaoui, W., Blanc, C., Pebere, N., Srhiri, A., Mankowski, G., *J. Appl. Electrochem.* 2000, 30, 959; Cao, P., Yao, J. L., Zheng, J. W., Gu, R. A., Tian, Z. Q., *Langmuir* 2002, 18, 100.
12. Diaz, D. D.; Punna, S.; Holzer, P.; Mcpherson, A. K.; Sharpless, K. B.; Fokin, V. V.; Finn, M. G. *J. Polym. Sci. Part A: Polym. Chem.* 2004 42, 4392.
13. Liu, Y.; Diaz, D. D.; Accurso, A. A.; Sharpless, K. B.; Fokin, V. V.; Finn, M. G. *J. Polym. Sci. Part A: Polym. Chem.* 2007 45, 5182.
14. Binder, W. H.; Sachsenhofer, R. *Macromol. Rapid Commun.* 2007, 28, 15.
15. Zheng, R.; Häussler, H.; Dong, H.; Lam, J. W. Y.; Tang, B. Z. *Macromolecules* 2006, 39, 7973.
16. Qin, A.; Jim, C. K. W.; Lu, W.; Lam, J. W. Y.; Häussler, H.; Dong, Y.; Sung, H. H. Y.; Williams, I. D.; Wong, G. K. L.; Tang, B. Z. *Macromolecules* 2007, 40, 2308.
17. Boren, B. C.; Narayan, S.; Rasmussen, L. K.; Zhang, L.; Zhao, H.; Lin, Z.; Jia, G.; Fokin, V. V. *J. Am. Chem. Soc.* 2008, 130, 8923.
18. Kolb et al. (2001) Angew. Chem. Int. Ed, 40:2004-2021; Lewis et al. (2002) Angew. Chem. Int. Ed, 41:1053-1057.

What is claimed is:

1. A high temperature-resistant metal adhesive comprising hyperbranched poly(triazole)s formed by diazide monomer (A₂) and triyne monomer (B₃):

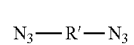

$$N_3 — R' — N_3 \qquad A_2$$

-continued

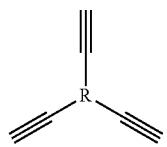

wherein R or R' is an organic compound optionally containing inorganic elements; and wherein $A_2$ and $B_3$ are selected from the group consisting of

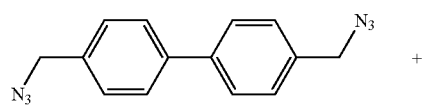

,

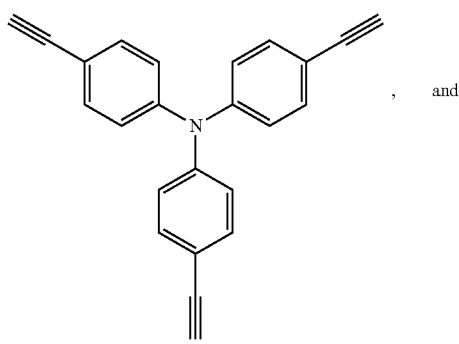

, and

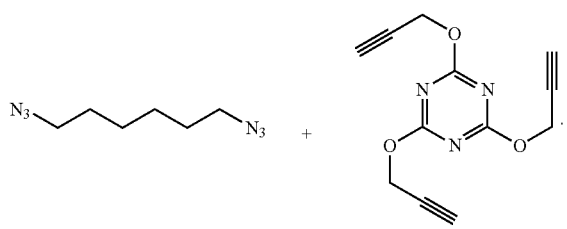

2. The adhesive of claim 1, wherein the hyperbranched poly(triazole)s are prepared by in situ click polymerization of diazide monomer ($A_2$) and triyne monomer ($B_3$) on metal surfaces.

3. The adhesive of claim 2, wherein the metal is Cu, Al or Fe.

4. The adhesive of claim 1, which has no weight loss below 200° C. and less than 5% weight loss at 400° C.

5. The adhesive of claim 2, wherein the hyperbranched poly(triazole)s are regiorandom hyperbranched polytriazoles.

6. The adhesive of claim 5, wherein the hyperbranched poly(triazole)s are poly(1,4/1,5-disubstituted 1,2,3-triazole)s and formed on Fe or Al metal surface via thermal Huisgen cycloaddition:

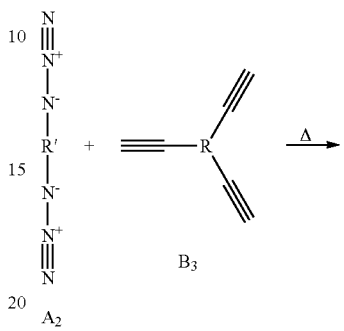

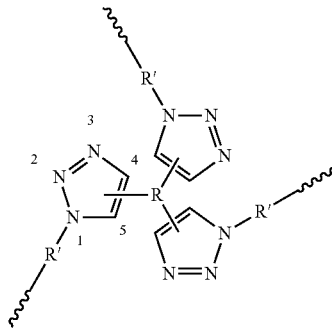

•Regiorandom
Hyperbranched
poly (1,4/1,5-disubstituted
1,2,3-triazole)

wherein R and R' are defined in claim 1.

7. The adhesive of claim 2, wherein the hyperbranched poly(triazole)s are regioregular hyperbranched poly(triazole)s.

8. The adhesive of claim 2, wherein the hyperbranched poly(triazole)s are poly(1,4-disubstituted 1,2,3-triazole)s and are formed on a Cu metal surface:

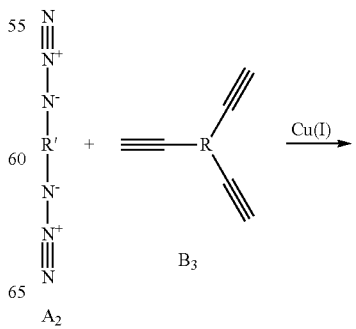

-continued
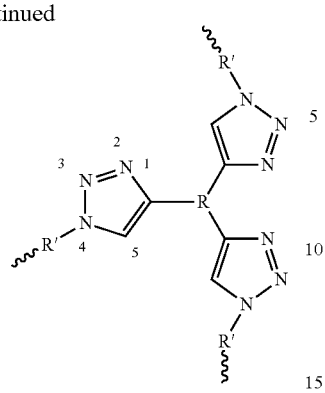
• Regioregular Hyperbranched poly (1,4-disubstituted 1,2,3-triazole)
wherein R and R' are defined in claim 1.
9. The adhesive of claim 1, having a 7 μm thick adhesive layer.
10. The adhesive of claim 1, having a high tensile strength.
11. The adhesive of claim 1, having high tensile strength when annealed at 100° C. or 150° C. for a period of time from 0.2 to 8 hours.
* * * * *